United States Patent
Hashimoto

(10) Patent No.: US 12,027,050 B2
(45) Date of Patent: Jul. 2, 2024

(54) HAZARD NOTIFICATION METHOD AND SYSTEM FOR IMPLEMENTING

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 284 days.

(21) Appl. No.: 17/707,878

(22) Filed: Mar. 29, 2022

(65) Prior Publication Data

US 2023/0316919 A1    Oct. 5, 2023

(51) Int. Cl.
G08G 1/16    (2006.01)
B60W 40/02   (2006.01)
B60W 40/09   (2012.01)
B60W 50/14   (2020.01)

(52) U.S. Cl.
CPC .......... G08G 1/162 (2013.01); B60W 40/02 (2013.01); B60W 40/09 (2013.01); B60W 50/14 (2013.01); *B60W 2420/403* (2013.01); *B60W 2510/20* (2013.01); *B60W 2540/00* (2013.01); *B60W 2540/225* (2020.02); *B60W 2556/65* (2020.02)

(58) Field of Classification Search
CPC ...... G08G 1/162; B60W 40/02; B60W 40/09; B60W 50/14; B60W 2420/403; B60W 2510/20; B60W 2540/00; B60W 2540/225; B60W 2556/65
See application file for complete search history.

(56) References Cited

U.S. PATENT DOCUMENTS

| | | | |
|---|---|---|---|
| 10,875,545 B2* | 12/2020 | Iwamoto | B60W 60/0016 |
| 11,603,104 B2* | 3/2023 | Iwase | G01C 21/3807 |
| 11,702,086 B2* | 7/2023 | Bielby | G06N 3/08 701/29.1 |
| 2012/0109418 A1* | 5/2012 | Lorber | G06Q 50/40 701/1 |
| 2014/0078282 A1 | 3/2014 | Aoki et al. | |
| 2017/0278323 A1* | 9/2017 | Gupta | H04L 63/1408 |
| 2020/0005644 A1 | 1/2020 | Ichimaru et al. | |
| 2020/0172097 A1 | 6/2020 | Hasegawa et al. | |
| 2021/0080950 A1* | 3/2021 | Tran | B60Q 5/005 |
| 2021/0344700 A1* | 11/2021 | Ueno | H04L 67/12 |

\* cited by examiner

*Primary Examiner* — Mohamed Barakat
(74) *Attorney, Agent, or Firm* — HAUPTMAN HAM, LLP

(57) ABSTRACT

A method of identifying a hazard includes receiving control parameter data from a first sensor attached to a vehicle, wherein the control parameter data is associated with a behavior of an occupant of the vehicle. The method further includes comparing the control parameter data with a performance distribution of the occupant to determine whether the control parameter indicates abnormal behavior. The method further includes identifying, in response to a determination that the control parameter indicates abnormal behavior, sensor data to be collected from a second sensor attached to the vehicle. The method further includes generating log data based on the collected sensor data. The method further includes transmitting the log data to an external device.

20 Claims, 9 Drawing Sheets

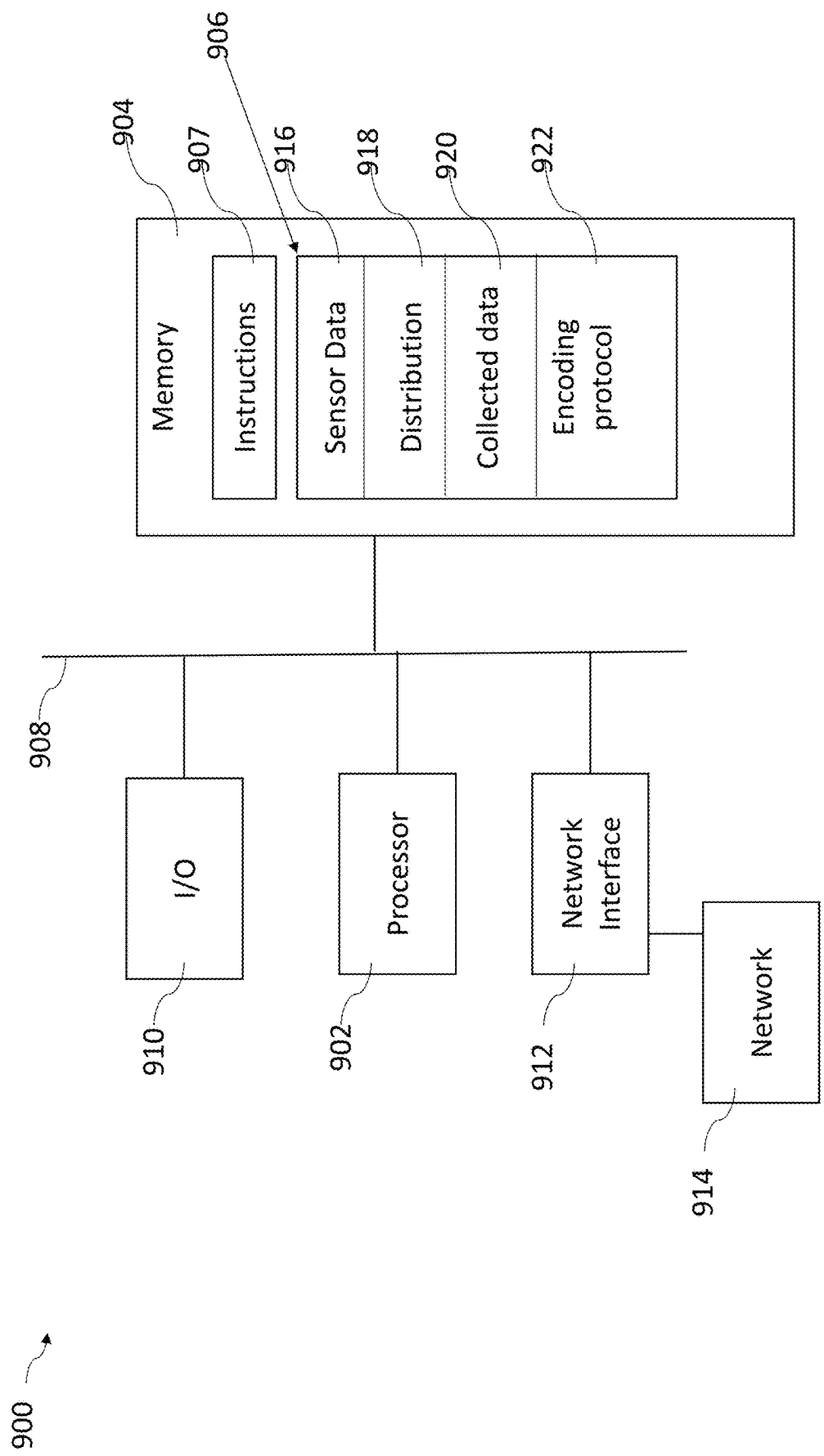

HAZARD NOTIFICATION METHOD AND SYSTEM FOR IMPLEMENTING

RELATED APPLICATIONS

This application is related to U.S. application Ser. No. 17/497,846, filed Oct. 8, 2021, which is hereby incorporated by reference in its entirety.

BACKGROUND

Drivers of vehicles operate the vehicle in a manner to avoid hazards along the path of the vehicle. Additionally, occupants of vehicles see hazards out of windows of the vehicle. Notifying occupants and drivers of other vehicles about hazards helps to reduce a risk of accidents or damage to the other vehicles. In some approaches, the driver or occupant uses a user interface (UI) within the observing vehicle to enter information about the hazard to provide a notification to other vehicles. In some approaches, the driver or occupant uses a mobile device to enter information about the hazard to provide a notification to other vehicles. These approaches rely on user input to provide information about the hazard.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 is a block diagram of a system for implementing hazard notification in accordance with some embodiments.

DETAILED DESCRIPTION

Figure 1:
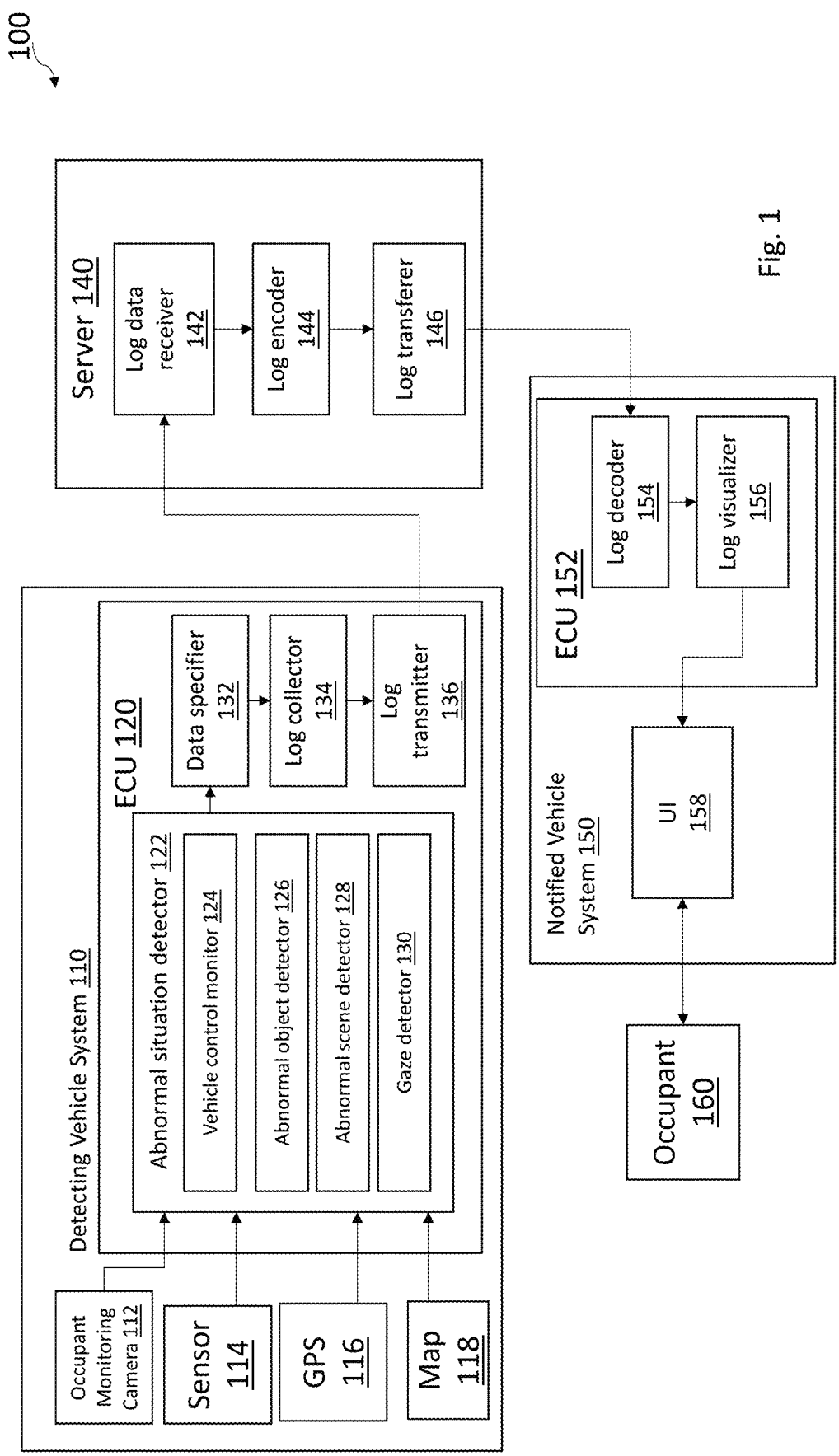
FIG. 1 is a block diagram of a hazard notification system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Providing advanced notification of hazards along a pathway traveled by a vehicle helps the driver of the vehicle to avoid the hazard without causing an accident or performing risky maneuvers with the vehicle. In some approaches, notifications are provided through mobile applications about hazards. However, these mobile applications rely on human interaction in order to input the hazard notifications. In some instances, this causes a driver to be distracted while inputting information into a user interface (UI) that provides the notification. In addition, the location of the hazard is often set at a location of the mobile device when the input of the hazard information is performed. This reduces the accuracy of identifying the true location of the hazard. In some instances, the person fails to enter information into the UI and the hazard goes unreported. In some instances, options for identifying the hazard in the mobile application are limited, which increases a risk that the driver of the other vehicle is unable to easily avoid the hazard.

This description provides an automated hazard notification system and method of using that is able to identify behavior of an occupant, including a driver, of a vehicle that is abnormal. In response to detecting abnormal behavior, the hazard notification system uses sensors within the vehicle to determine whether a hazard exists in an environment surrounding the vehicle. If a hazard is detected, log data is collected and transmitted to a server for encoding and dissemination to other vehicles to notify the drivers of the other vehicles of the hazard. As a result, drivers have advanced notice of hazards without the system relying on human input to report the presence of the hazard.

In some embodiments, the hazard and hazard location are displayed on a vehicle UI. In some embodiments, an image of the hazard is provided to the notified vehicle. In some embodiments, the notified vehicle is configured to provide confirmation of the presence of the hazard, updated information about the hazard or other suitable information either automatically or based on an input from an occupant of the notified vehicle.

While this description focuses on automobiles, one of ordinary skill in the art would understand that this description is applicable to other vehicles, such as trains, airplanes, or other suitable vehicles. This description is also applicable to notifying autonomous driving systems within vehicles, not just human drivers of the vehicles.

FIG. 1 is a block diagram of a hazard notification system 100, in accordance with some embodiments. The description of the hazard notification system 100 focuses on an automobile controlled by a driver. However, one of ordinary skill in the art would recognize that other vehicles and operators are within the scope of this description, such as a train operated by an engineer or other mobile vehicles. The description also refers to hazards in a roadway. One of ordinary skill in the art would understand that this description is not limited to hazards in the roadway. For example, in some embodiments, the hazard is along a path, such as an all-terrain vehicle (ATV) trail, a train track or other pathway traveled by a vehicle. Further, in some embodiments, the hazard is adjacent to the roadway instead of actually in the roadway.

The hazard notification system 100 includes a detecting vehicle system 110 configured to determine whether a hazard exists in a roadway and to capture information about the hazard in response to determining that the hazard is present. The detecting vehicle system 110 captures information about the hazard and transmits the information to a server. The hazard notification system 100 further includes a server 140 configured to receive the hazard information, encode the hazard information, and disseminate the hazard information to one or more other vehicles connected to the server 140. The hazard notification system 100 further includes a notified vehicle system 150 configured to receive the encoded hazard information and to notify an occupant 160 of the notified vehicle about the presence and location of the hazard. In some embodiments, the notified vehicle is further configured to notify the occupant 160 about a type of the hazard. In some embodiments, a vehicle is capable of functioning as the detecting vehicle system 110 for a first hazard and functioning as the notified vehicle system 150 for a second hazard different from the first hazard.

The detecting vehicle system 110 includes an electronic control unit (ECU) 120 configured to receive data from an occupant monitoring camera 112, a front camera 114, a global positioning system (GPS) 116 and a map 118. The ECU 120 includes an abnormal situation detector 122, a data specifier 132, a log collector 134 and a log transmitter 136. The abnormal situation detector 122 includes a vehicle control monitor 124, an abnormal object detector 126, an abnormal scene detector 128 and a gaze detector 130.

In some embodiments, the ECU 120 further includes an attention area recognizer configured to determine a position of a gaze of the occupant. In some embodiments, the ECU 120 further includes a localization unit configured to receive data from the GPS 116 and the map 118 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The occupant monitoring camera 112 is configured to capture images of a driver, or other occupant, of the viewing vehicle. The occupant monitoring camera 112 is connected to the vehicle. In some embodiments, the occupant monitoring camera 112 includes a visible light camera. In some embodiments, the occupant monitoring camera 112 includes an infrared (IR) camera or another suitable sensor. In some embodiments, the occupant monitoring camera 112 is movable relative to the vehicle in order to capture images of at least one eye of an occupant that are different sizes. While capturing images of both eyes of the occupant is preferred, some occupants have only a single eye, and in some instances where a head of the occupant is turned away from the occupant monitoring camera 112, only one of the occupant's eyes is capturable by the occupant monitoring camera 112. In some embodiments, the occupant monitoring camera 112 is adjusted automatically. In some embodiments, the occupant monitoring camera 112 is manually adjustable. In some embodiments, the captured image includes at least one eye of the occupant. In some embodiments, the occupant monitoring camera 112 includes multiple images capturing devices for capturing images of different regions of the occupant. In some embodiments, occupant monitoring cameras 112 are located at different locations within the vehicle. For example, in some embodiments, a first occupant monitoring camera 112 is located proximate a rear-view mirror in a central region of the vehicle; and a second occupant monitoring camera 112 is located proximate a driver-side door. One of ordinary skill in the art would recognize that other locations for the occupant monitoring camera 112, which do not interfere with operation of the vehicle, are within the scope of this disclosure. In some embodiments, the data from the occupant monitoring camera 112 includes a timestamp or other metadata to help with synchronization with other data.

One of ordinary skill in the art would understand that in some embodiments the vehicle system 110 includes additional cameras for monitoring multiple occupants. Each of the additional cameras are similar to the occupant monitoring camera 112 described above. For example, in some embodiments, one or more monitoring cameras are positioned in the vehicle for capturing images of at least one eye of a front-seat passenger. In some embodiments, one or more monitoring cameras are positioned in the vehicle for capturing images of at least one eye of a rear-seat passenger. In some embodiments, the additional cameras are only activated in response to the vehicle detecting a corresponding front-seat passenger or rear-seat passenger. In some embodiments, an operator of the vehicle is able to selectively de-activate the additional cameras. In embodiments including additional cameras, the captured images are still sent to the gaze detector 130; and the gaze detector 130 is able to generate a gaze result for each of the monitored occupants of the vehicle.

The sensor 114 is configured to capture information, such as images, of an environment surrounding the vehicle. In some embodiments, the sensor 114 includes a visible light camera, an IR camera. In some embodiments, the sensor 114 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 114 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting abnormal objects or scenes being viewed by the occupants of the vehicle. For example, in some embodiments, additional cameras are located on a back side of the vehicle in order to detect a larger portion of the environment to a rear of the vehicle. This information helps to capture abnormal objects that vehicle occupants other than the driver are able to view out of rear window. In some embodiments, the data from the sensor 114 includes a timestamp or other metadata in order to help synchronize the data from the sensor 114 with the data from the occupant monitoring camera 112.

The GPS 116 is configured to determine a location of the vehicle. Knowing the location of the viewing vehicle helps to relate an abnormal object or scene with the direction that drew the attention of the occupants and with the objects and areas that are related to determined locations on the map 118. Knowing the heading of the vehicle helps to predict which direction an occupant of the vehicle is looking in order to assist with generation of gaze data. Knowing a speed of the viewing vehicle helps to determine how long an occupant of the vehicle had an opportunity to view an object. For example, in some embodiments, the occupant viewing an object or scene for a long time in a fast-moving vehicle is more likely to be identified as an abnormal object than an object or scene viewed for a same period of time in a slow-moving vehicle. In a fast moving vehicle, a total amount of possible time that a scene or object is visible to an occupant of a vehicle is less than a slow moving vehicle. By accounting for a speed of the vehicle, a percentage of time that the occupant views the scene or object out of the maximum possible time that the scene or object is visible helps to determine whether the scene or object strongly attracted the attention of the occupant. The stronger the attraction for the occupant causes the occupant to view the scene or object for a higher percentage of the time period that the scene or object is visible to the occupant. As a result, knowing the location of the vehicle at different times helps with correlating occupant behavior with objects and scenes that are potentially abnormal.

The map 118 includes information related to the roadway and known objects along the roadway. In some embodiments, the map 118 is usable in conjunction with the GPS 116 to determine a location and a heading of the vehicle. In some embodiments, the map 118 is received from an external device, such as the server 140. In some embodiments, the map 118 is periodically updated based on information from the front camera 114 and/or the GPS 116. In some embodiments, the map 118 is periodically updated based on information received from the external device. In some embodiments, the map 118 is generated from sensor data by simultaneous localization and mapping (SLAM) algorithm. Including the map 118 helps to determine whether an object is abnormal. For example, in some embodiments, the occupant of the vehicle will view a known road sign for a prolonged period of time; however, the road sign is not an abnormal object and should not generate a hazard notification. Including the map 118 having known objects helps to reduce a risk of false positive hazard notifications.

The following description will focus primarily on analysis of information related to the driver for the sake of brevity. One of ordinary skill in the art would understand that the description is applicable to other occupants, such as front-seat passengers or rear-seat passengers, of the vehicle as well.

The abnormal situation detector 122 is configured to generate a profile of a normal behavior of the driver and determine whether an abnormal deviation from the normal behavior is detected. In some embodiments, the profile of the normal behavior relates to a plurality of behaviors. In some embodiments, the behaviors included at least one of viewing direction behavior, speed of travel behavior, acceleration/braking behavior, steering behavior, or other suitable behaviors. The viewing direction behavior relates to how much of the attention of the driver is directed in a direction that the vehicle is traveling. For example, does the driver often look out of side windows of the vehicle. The speed of travel behavior relates to a speed that the driver normally operates the vehicle. For example, does the driver normally travel above or below a speed limit along the roadway. The acceleration/braking behavior relates to how the driver normally uses the accelerator or the brakes. For example, does the driver normally accelerate slowly or press the accelerator hard; or does the driver normally slowly coast to a stop or press hard on the brakes. The steering behavior relates to a magnitude and suddenness of turning of a steering wheel of the vehicle. For example, does the driver often turn the steering wheel a large magnitude or does the driver often take wider turns by turning the steering wheel less. In some embodiments, a correlation between the factors is used to develop the profile. For example, in some embodiments, a speed of the vehicle and a steering behavior are combined. That is, at a higher vehicle speed does the driver turn the steering wheel to a lesser degree than at a lower vehicle speed. Using the normal behavior profile of the driver, the abnormal situation detector 122 is able to determine whether the driver performs an act that is significantly different from the normal behavior in order to determine whether an abnormal object or abnormal scene is likely to be present in the environment surrounding the vehicle.

Based on the normal behavior profile, one or more performance curves are developed for the driver. In some embodiments, each driver has unique performance curves and the abnormal situation detector 122 is configured to determine the likely presence of an abnormal object or abnormal scene based on an identity of the driver. In some embodiments, an identity of the driver is determined based on the occupant monitoring camera 112 data. In some embodiments, the identity of the driver is determined based on an input received from the driver, e.g., through a UI. In some embodiments, the identity of the driver is determined based on official records, such as the person registered as the owner of the vehicle. In some embodiments, the driver performance is considered abnormal in response to a detected performance being three or more standard deviations from a normal behavior determined by the performance curves. Additional information with respect to performance curves is provided below with respect to FIG. 6. In some embodiments, detecting vehicle system 110 further includes a traffic information receiver that receives travel information, such as Vehicle Information and Communication System (VICS) or Traffic Message Channel (TMC), from outside of the detecting vehicle system 110. When the detecting vehicle system 110 receives the information indicating that some abnormal situation is happening at a place near the detecting vehicle system 110, then the abnormal situation detector is able to lower a threshold for determining that the abnormal situation is happening. Combining the information at the detecting vehicle system 110 and the traffic information helps to reduce the false positives.

The vehicle control monitor 124 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. In some embodiments, the data collected by the vehicle control monitor 124 is used to continuously update the performance curve associated with the driver. The vehicle control monitor 124 is configured to determine whether any of the received sensor data indicates an abnormal deviation from the normal behavior of the driver.

The abnormal object detector 126 is configured to receive sensor data from the sensor 114 to determine whether any abnormal objects are located in the roadway. In some embodiments, the abnormal object detector 126 is further configured to determine whether any abnormal objects are present along or adjacent to the roadway. In some embodiments, the sensor data from the sensor 114 includes an image and the abnormal object detector 126 is configured to perform image recognition on the received image, e.g., using a trained neural network, to identify abnormal objects. In some embodiments, the abnormal object detector 126 is configured to compare any identified objects with information from the GPS 116 and the map 118 to help determine whether an identified object is an abnormal object. In some embodiments, the abnormal object detector 126 is configured to identify objects such as a fallen object, e.g., a tire, a car part, etc., an animal, a pothole, a traffic regulation board, an emergency vehicle, a vehicle with hazard lights active, or other suitable objects as abnormal objects.

The abnormal scene detector 128 is configured to receive the sensor data from the sensor 114 to determine whether any abnormal scenes are located in an environment surrounding the vehicle. An abnormal scene is different from an abnormal object in that the abnormal scene is able to include normal objects that are arranged in an abnormal manner. In some embodiments, the abnormal scene detector 128 is configured to determine that a vehicle accident has occurred in response to detecting that two or more vehicles are in contact with one another or that a vehicle is surrounded by multiple fallen objects. In some embodiments, the abnormal scene detector 128 is configured to determine that construction is occurring based on detecting multiple construction vehicles in close proximity. In some embodiments, the abnormal scene detector 128 is configured to determine that a vehicle is parked on a shoulder of the roadway based on determining that a vehicle is located adjacent to the roadway and is not moving or is moving significantly slower than other vehicles. In some embodiments, the abnormal scene detector 128 is configured to determine an abnormal scene based on detecting a vehicle having hazard lights active. In some embodiments, the abnormal scene detector 128 is configured to use image recognition, such as through a trained neural network, to determine whether any criteria for identifying an abnormal scene is present.

The gaze detector 130 is configured to receive data from the occupant monitoring camera 112 and generate a detected gaze result. The detected gaze result includes a direction that the eyes of the occupant are looking. In some embodiments, the direction includes an azimuth angle and an elevation angle. Including azimuth angle and elevation angle allows a determination of a direction that the driver is looking both parallel to a horizon and perpendicular to the horizon. In some embodiments, the detected gaze result further includes depth information. Depth information is an estimated distance from the driver that visual axes of the driver's eyes converge. Including depth information allows a determination of a distance between the driver and an object on which the driver is focusing a gaze. Combining depth information along with azimuth angle and elevation angle increases a precision of the detected gaze result. In some embodiments where the captured image includes only a single eye of the occupant, the determining depth information is difficult, so only azimuth angle and elevation angle are determined by the gaze detector 130. In some embodiments, the gaze detector 130 is further configured to receive data from the sensor 114 and to associate the detected gaze with a pixel location of an image from the sensor 114 based on the azimuth angle and elevation angle.

In some embodiments, the gaze detector 130 is not attached to the vehicle. In some embodiments, the gaze detector 130 is attached to the occupant of the viewing vehicle. For example, in some embodiments, the gaze detector 130 includes smart glasses, another piece of smart clothing or other such device that is capable of determining gaze information of a wearer. In some embodiments that utilize smart glasses, gaze data is able to be collected from pedestrians, people riding bicycles or other people that are not in a vehicle. The hazard notification system 100 is able to utilize this gaze data in order to help identify objects of interest.

The gaze detector 130 is also configured to determine whether the driver is viewing an abnormal direction, e.g., out of a side window of the vehicle, for an abnormally long period of time. For example, in some embodiments, where an accident has occurred or a police vehicle is present, the driver will look at the accident or police vehicle out of the side window of the vehicle while driving the vehicle.

In some embodiments, each of the abnormal object detector 126, the abnormal scene detector 128 and the gaze detector 130 are active during an entire period of operation of the vehicle, e.g., when an engine or motor of the vehicle is running. In some embodiments, at least one of the abnormal object detector 126, the abnormal scene detector 128 or the gaze detector 130 is activated in response to the vehicle control monitor 124 determining that an abnormal behavior was detected.

The data specifier 132 is configured to receive a determination that abnormal behavior, an abnormal object or an abnormal scene, collectively referred to as an abnormal situation, was detected. The data specifier 132 is configured to analyze the received information to determine what sensor data from the sensor 114 should be collected based on the received data. For example, in some embodiments where an abnormal steering behavior by the driver is detected, the data specifier 132 is configured to determine that image data from a front camera of the sensor 114 should be captured. Further, the data specifier 132 is configured to determine a time period over which the data from the determine sensor should be collected based on a time of the detected abnormal situation.

In some embodiments, the data specifier 132 is configured to determine a region of the received sensor data that is relevant to the detected abnormal situation. In some embodiments, the region of the received sensor data is identified based on gaze data from the gaze detector 130. In some embodiments, the region of the received sensor data is identified based on object recognition performed on the sensor data, e.g., by the abnormal object detector 126 or the abnormal scene detector 128. In some embodiments, the data specifier 132 is configured to crop a received image from the sensor data or remove extraneous data from the sensor data if the sensor data is not an image to reduce an amount of information in a log of the abnormal situation. In some embodiments, the data specifier is configured to remove personal information such as license plate, human faces, etc. from the sensor data.

The log collector 134 is configured to receive data from the data specifier 132. In some embodiments, the log collector 134 is configured to receive data directly from the sensor 114, the GPS 116, or the abnormal situation detector 122 based on information provided by the data specifier 132. The log collector 134 is also configured to determine what information is useful for identifying the type and location of the hazard, such as location information from the GPS 116 or the map 118, image information from the sensor 114, cropped or reduced information from the data specifier 132, gaze data from the gaze detector 130, timestamp information related to a time the abnormal situation was detected, or other suitable information.

The log collector 134 generates log data based on the received and correlated data, such as the cropped image and location data. The log collector 134 also associates timestamp information with the log data in order to assist with synchronization of the collected data and for queue priority within the server 140. In some embodiments, the log collector 134 generates the log data to further include world coordinates associated with the cropped image. In some embodiments, the log collector 134 generates the log data to further include a map location associated with the cropped image. In some embodiments, the log collector 134 includes additional information to assist in increasing accuracy of determining the abnormal situation type and abnormal situation location.

While the above description relates to generating log data based on an image from the sensor 114, one of ordinary skill in the art would understand that the log collector 134 is not limited solely to generating log data based on images. In some embodiments, the log collector 134 is configured to generate log data based on information from other sensors attached to the vehicle, such as RADAR, LiDAR, or other suitable sensors. In some embodiments where the occupant is wearing smart glasses, the log collector 134 is further configured to generate the log data based on information received from the smart glasses.

The log transmitter 136 is configured to receive log data from the log collector 134 and transmit the log data to the server 140. In some embodiments, the log transmitter 136 is configured to transmit the log data wirelessly. In some embodiments, the log transmitter 136 is configured to transmit the log data via a wired connection. In some embodiments, the log transmitter 136 is configured to transmit the log data to the notified vehicle system 150 directly. In some embodiments, the log transmitter 136 is configured to transmit the log data to a mobile device accessible by the occupant, which in turn is configured to transmit the log data to the server 140. In some embodiments, the log transmitter 136 is configured to transmit the log data to the mobile device using Bluetooth® or another suitable wireless technology. In some embodiments, the ECU 120 is configured to determine whether the data transfer rate from the mobile device to the server 140 is higher than a transfer rate from the log transmitter 136 to the server 140. In response to a determination that the data transfer rate from the mobile device to the sever 140 is higher, the log transmitter 136 is configured to transmit the log data to the mobile device to be transmitted to the server 140. In response to a determination that the data transfer rate from the mobile device 160 to the server 140 is not higher, the log transmitter 136 is configured to transmit the log data to the server 140 from the vehicle system 110 directly without transferring the log data to the mobile device 160.

In some embodiments, the detecting vehicle system 110 further includes a memory configured to store sensor data from sensors attached to the vehicle. In some embodiments, the memory is further configured to store information associated with previous abnormal situations. In some embodiments, in response to detecting an abnormal situation that matches a previous abnormal situation, the data specifier 134 is configured to provide results based on the matching abnormal situation. In some embodiments, the detecting vehicle system 110 is further configured to determine whether the detecting vehicle has received from the server 140 information related to an abnormal situation that matches the determined abnormal situation from the abnormal situation detector 122. In some embodiments, in response to determining that the detecting vehicle has already received information related to the determined abnormal situation, the detecting vehicle system 110 is configured to prevent transmission of the log data to the server. Avoiding transmission of redundant information to the server 140 helps to reduce data transmitted to the server 140 and helps to minimize power consumption by the detecting vehicle. In some embodiment, the storing of the previous requests is called caching. One of ordinary skill in the art would understand caching as using hardware or software to store data so that future requests for that data are able to be served faster.

The server 140 includes a log data receiver 142 configured to receive the log data from the log transmitter 136. In some embodiments, the log data receiver 142 is configured to receive the log data from the mobile device. The server 140 further includes a log encoder 144 configured to encode the log data. The server 140 further includes a log transferer 146 configured to transmit the encoded log data to the notified vehicle system 150.

The log data receiver 142 is configured to receive the log data from the log transmitter 136. In some embodiments, the log data receiver 142 is configured to receive the log data from the mobile device. In some embodiments, the log data receiver 142 is configured to receive the log data wirelessly. In some embodiments, the log data receiver 142 is configured to receive the log data via a wired connection. In some embodiments, the log data receiver 142 is configured to attach a timestamp for a time that the log data was received to the log data.

The log encoder 144 is configured to encode the received log data according to a predetermined encoding protocol. Encoding the log data according to a predetermined encoding protocol helps to ensure that the notified vehicle system 150 is able to reliably decode the log data for use by the notified vehicle system 150. In some embodiments, the log encoder 144 is configured to perform compression of the log data, image encoding, thumbnail image creation, or other suitable encoding protocols. In some embodiments, the log encoder 144 is configured to perform encryption of the log data. In some embodiments, the log encoder 144 is further configured to perform super-resolution to make the data more visible for occupant 160. One of ordinary skill in the art would understand that super-resolution is a process of receiving a high-resolution image from a low-resolution image. Improving the resolution of the log data helps to reduce false positives or false negatives.

In some embodiments, the server 140 further includes a database for storing received log data. In some embodiments, the log data is stored in the database prior to and/or after encoding by the log encoder 144. In some embodiments, the log data is stored in the database in a priority queue. In some embodiments, the priority of the priority queue is determined based on a time that the abnormal situation was detected, a time that the log data was received by the log data receiver 142, a type of the abnormal situation, an identity of the driver of the detecting vehicle, or other suitable priority criteria.

The log transferer 146 is configured to receive the encoded log data from the log encoder 144. The log transferer 146 is configured to transmit the encoded to the notified vehicle system 150. In some embodiments, the log transferer 146 is configured to transmit the encoded log data to a mobile device accessible by an occupant of the notified vehicle in addition or instead of to the notified vehicle system 150. In some embodiments, the log transferer 146 is configured to transfer the encoded log data wirelessly. In some embodiments, the log transferer 146 is configured to transmit the encoded log data via a wired connection. In some embodiments, the log transferer 146 is configured to transmit encoding protocol information along with the encoded log data. Transmitting the encoding protocol information for the encoded log data helps the mobile device or the notified vehicle system 150 to accurately decode the encoded log data for use by the notified vehicle system 150.

In some embodiments, the server 140 is configured to receive location in formation from multiple vehicles. In some embodiments, the server 140 is configured to receive navigation plans from multiple vehicles. In some embodiments, the log transferer 146 is configured to limit the transmission of encoded log data to only vehicles that are within a predetermined distance of the abnormal situation. In some embodiments, the log transferer 146 is configured to limit the transmission of encoded log data to only vehicles that have a navigation plan that indicates that the vehicle is pass within a predetermined distance of the abnormal situation. Limiting the vehicles that receive the encoded log data helps to reduce extraneous data being transferred to vehicles connected to the server that would not be impacted by the abnormal situation.

In some embodiments, the server 140 is configured to transmit only log data associated with a newly identified abnormal situation. That is, if the abnormal situation has already been reported by the server 140, the abnormal situation is not reported again. Limiting the repetitive reporting of abnormal situations helps to reduce redundant data received by vehicles connected to the server 140.

The notified vehicle system 150 includes an ECU 152. The ECU 152 includes a log decoder 154 configured to receive the encoded log data from the log transferer 146. The ECU 152 further includes a log visualizer 156 configured to generate a visual representation of the abnormal situation based on the decoded log data. The notification vehicle system 150 further includes a UI 158 configured to display the visual representation of the decoded log data or provide a notification to the occupant 160 based on the decoded log data.

The log decoder 154 is configured to receive information from the encoded log data from the log transferer 146 and to decode the received data. In some embodiments, the log decoder 154 is configured to receive the information wirelessly. In some embodiments, the log decoder 154 is configured to receive the information via a wired connection. In some embodiments, the log decoder 154 is configured to decode the encoded log data according to a predetermined decoding protocol that is matched with a predetermined encoding protocol used by the server 140. In some embodiments, the log decoder 154 is configured to decode the encoded log data based on received encoding protocol information.

The log visualizer 156 is configured to receive the decoded log data and generate a visual representation of the detected abnormal situation based on the decoded log data. In some embodiments, the log visualizer 156 is configured to generate an image of the abnormal situation. In some embodiments, the log visualizer 156 is configured to visualize the LiDAR point cloud data. One of ordinary skill in the art would recognize that point cloud data includes a set of data points in space that are usable to represent a three-dimensional shape or object based on a distance of each point from the detector. In some embodiments, the log visualizer 156 is configured to highlight a portion of the generated image associated with the abnormal situation, e.g., based on gaze data in the decoded log data. In some embodiments, the log visualizer 156 is configured to generate an icon representing the abnormal situation. In some embodiments, the log visualizer 156 is configured to generate a visual or audio warning associated with the visual representation of the abnormal situation. In some embodiments, the log visualizer 156 is configured to generate a map including a position of the abnormal situation.

The UI 158 is configured to receive information from the log visualizer 156 and provide a notification to the occupant 160. In some embodiments, the occupant 160 is a driver. In some embodiments, the occupant 160 is not the driver. In some embodiments, the UI 158 includes a touchscreen. In some embodiments, the UI 158 is part of a smartphone. In some embodiments, the UI 158 is integrated into a vehicle including the notified vehicle system 150. In some embodiments, the UI 158 is configured to receive input from the occupant 160. In some embodiments, the UI 158 is configured to receive an input indicating confirmation of the abnormal situation. In some embodiments, the UI 158 is configured to receive an input corresponding to a data request from the occupant 160 requesting additional information about an abnormal situation. In some embodiments, the additional information includes an updated navigation plan for routing the notified vehicle around the abnormal situation. For example, where the abnormal situation is a vehicle accident, in some embodiments, the UI 158 receives a request for a navigation plan that avoids a location of the vehicle accident to avoid traffic associated with the vehicle accident. In some embodiments, the UI 158 receives feedback from occupant 160 about whether the notification was accurate or not about whether the occupant liked the notification or not. Including this feedback helps to train the log transferer 146 and log visualizer 156 as a neural network in order to suppress false positives.

In some embodiments, the UI 158 is configured to provide a suggestion to the driver of the notified vehicle to avoid the abnormal situation. In some embodiments, the suggestion includes a visual or audio suggestion. In some embodiments, the suggestion includes a recommendation to avoid a specific lane of traffic. In some embodiments, the suggestion includes a recommendation to avoid a specific road. In some embodiments, the suggestion includes a recommendation for a new navigation path for the notified vehicle. In some embodiments, the suggestion includes a recommendation to reduce a speed of the vehicle.

In some embodiments where the notified vehicle system 158 is part of an autonomously operable vehicle, the notified vehicle system 150 is configured to automatically update a travel plan of the autonomous vehicle to avoid the abnormal situation. In some embodiments, the updated travel plan includes instructions for the autonomous vehicle to change lanes, take a different road, reduce speed, or other suitable instructions.

One of ordinary skill in the art would understand that modifications to the hazard notification system 100 are within the scope of this disclosure. For example, in some embodiments, the detecting vehicle system 110 is able to transmit log data directly to the notified vehicle system 150 over a network, such as a wireless network. In some embodiments, a mobile device of an occupant in the detecting vehicle is able to transmit log data directly to a mobile device of an occupant of the notified vehicle over a network, such as a wireless network.

By automatically identifying and disseminating information related to abnormal situations detected in an environment surrounding a vehicle, other vehicle systems are able to receive hazard data with precise location information associated with the hazard data. The automatic detection and dissemination also helps to minimize distractions for a driver of a detecting vehicle at a time when an abnormal situation is occurring, and the driver is already partially distracted from operating the vehicle.

Figure 2:
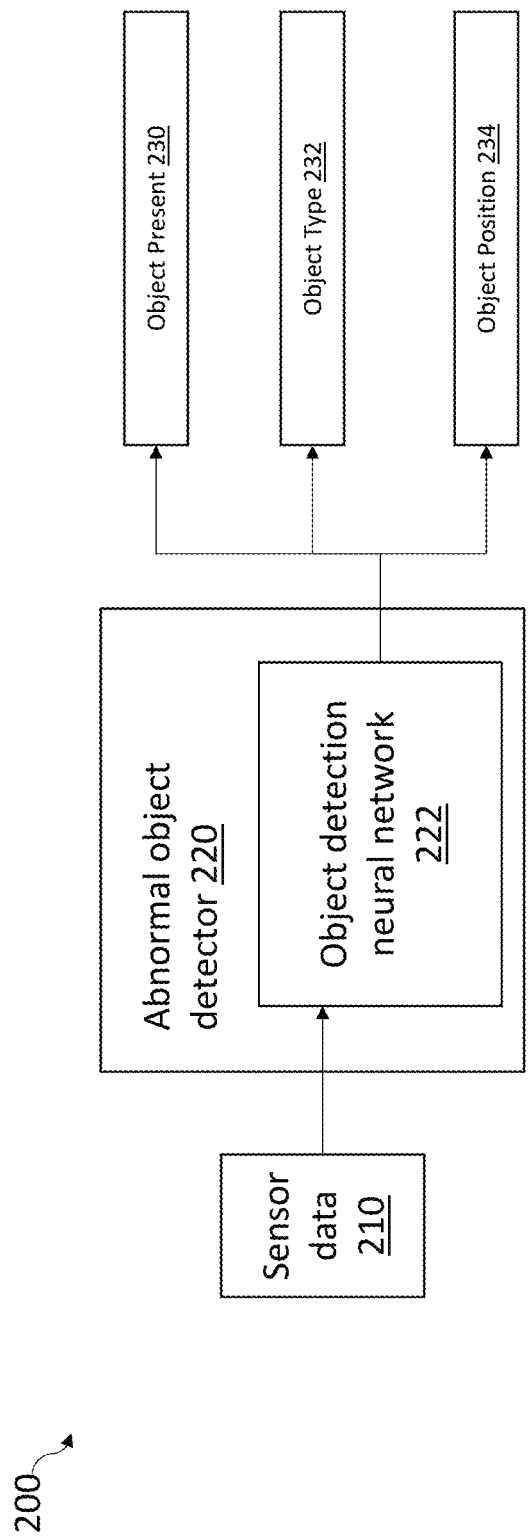
FIG. 2 is a functional diagram of a portion of a detecting vehicle system in accordance with some embodiments.

FIG. 2 is a functional diagram 200 of a portion of a detecting vehicle system in accordance with some embodiments. In some embodiments, the detecting vehicle system includes the detecting vehicle system 110 (FIG. 1). In some embodiments, the functionality of the diagram 200 is implemented using abnormal object detector 126 (FIG. 1). In some embodiments, the functionality of the diagram 200 is implemented using system 900 (FIG. 9).

Sensor data 210 is collected from one or more sensors attached to a vehicle. In some embodiments, the one or more sensors are integral with the vehicle. In some embodiments, at least one of the one or more sensors is separable from the vehicle. In some embodiments, at least one of the one or more sensors includes smart glasses. In some embodiments, the one or more sensors correspond to sensor 114 (FIG. 1).

The sensor data 210 is received by an abnormal object detector 220. In some embodiments, the abnormal object detector 220 corresponds to the abnormal object detector 126 (FIG. 1). The abnormal object detector 220 includes an object detection neural network 222. The object detection neural network 222 is configured to analyze the sensor data 210 to determine whether any objects are present within the sensor data 210. In some embodiments, the object detection neural network 222 is further configured to compare any identified objects with map data, e.g., from the map 118 (FIG. 1), to determine whether the identified object is an abnormal object. The object detection neural network 222 includes a fully or partially trained neural network usable for object recognition. In some embodiments, the object detection neural network 222 includes a fully convolutional neural network. In some embodiments, the object detection neural network 222 is configured to receive updated parameters and weights from an external device. In some embodiments, the object detection neural network 222 is configured to receive updated parameters and weights periodically. In some embodiments, the object detection neural network 222 is configured to receive updated parameters and weights in response to a request from an occupant of a vehicle including the detecting vehicle system. In some embodiments, a semantic segmentation neural network is used instead of the object detection neural network 222.

The object detection neural network 222 is configured to output a determination regarding whether an object is present 230. In some embodiments, the object neural network 222 is configured to only output a determination that an object is present in response to a determination that the object is an abnormal object. The object detection neural network 222 is further configured to output an object type 232 in response to a determination that an object is present. The object detection neural network 222 is further configured to output an object position 234 in response to a determination that an object is present.

One of ordinary skill in the art would understand that modifications to the functional diagram 200 are within the scope of this disclosure. For example, in some embodiments, the object detection neural network 222 is configured to receive gaze data, e.g., from gaze detector 130 (FIG. 1), to assist with determination of a position of the object. In some embodiments, the object detection neural network 222 is configured to receive GPS data, e.g., from GPS 116 (FIG. 1), to assist with determination of a position of the object.

One of ordinary skill in the art would understand that additional modifications are also within the scope of this description.

Figure 3:
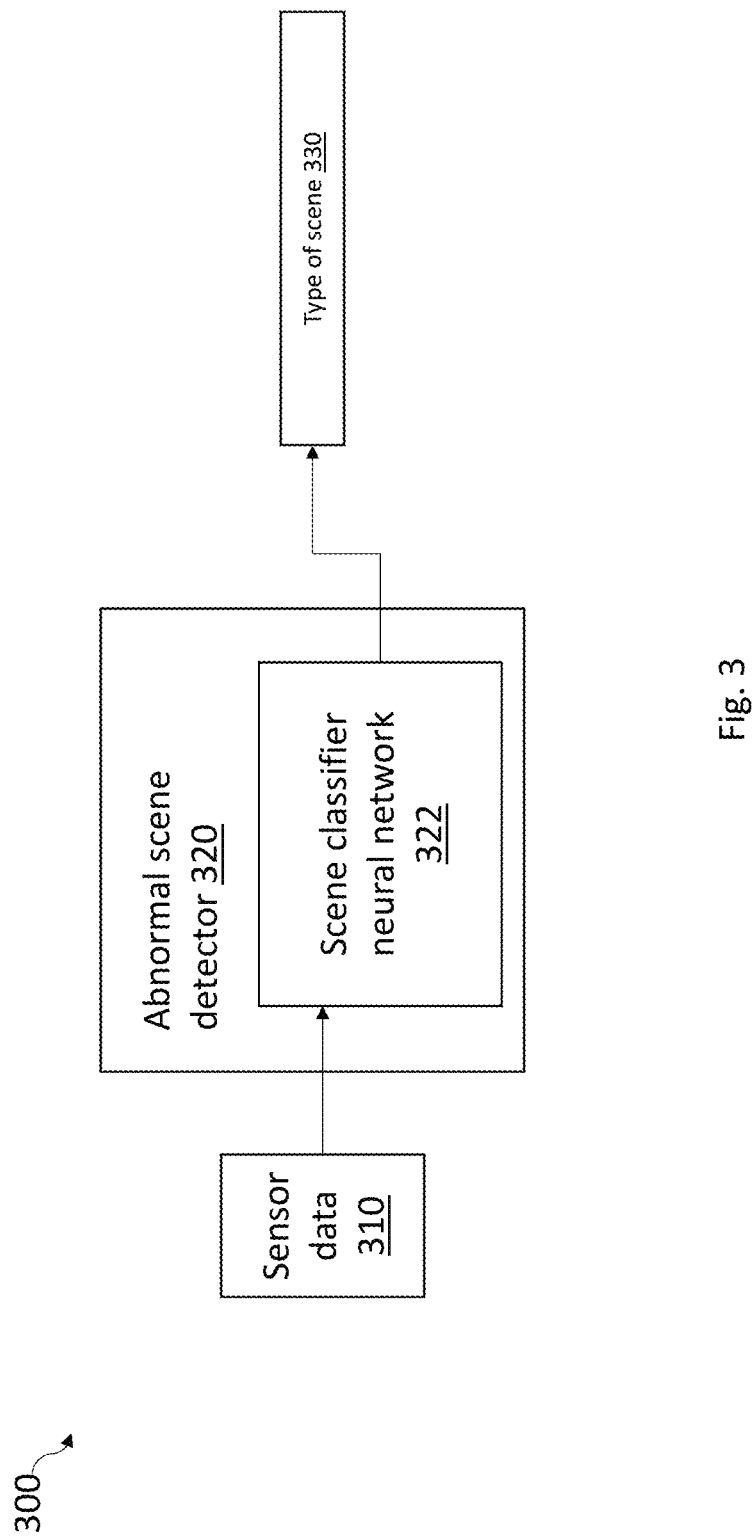
FIG. 3 is a functional diagram of a portion of a detecting vehicle system in accordance with some embodiments.

FIG. 3 is a functional diagram 300 of a portion of a detecting vehicle system in accordance with some embodiments. In some embodiments, the detecting vehicle system includes the detecting vehicle system 110 (FIG. 1). In some embodiments, the functionality of the diagram 300 is implemented using abnormal scene detector 128 (FIG. 1). In some embodiments, the functionality of the diagram 300 is implemented using system 900 (FIG. 9).

Sensor data 310 is collected from one or more sensors attached to a vehicle. In some embodiments, the one or more sensors are integral with the vehicle. In some embodiments, at least one of the one or more sensors is separable from the vehicle. In some embodiments, at least one of the one or more sensors includes smart glasses. In some embodiments, the one or more sensors correspond to sensor 114 (FIG. 1).

The sensor data 310 is received by an abnormal scene detector 320. In some embodiments, the abnormal scene detector 320 corresponds to the abnormal scene detector 128 (FIG. 1). The abnormal scene detector 320 includes a scene classifier neural network 322. The scene classifier neural network 322 is configured to analyze the sensor data 310 to determine whether an environment surrounding the vehicle includes an abnormal scene or combination of objects. In some embodiments, the scene classifier neural network 322 is configured to receive multiple images from the sensor data 310 to determine whether flashing lights, e.g., emergency vehicle lights, vehicle hazard lights, or other flashing lights, are present in the environment surrounding the vehicle. In some embodiments, the scene classifier neural network 322 is further configured to compare any identified scenes with map data, e.g., from the map 118 (FIG. 1), to determine whether the identified scene is an abnormal scene. The scene classifier neural network 322 includes a fully or partially trained neural network usable for object recognition. In some embodiments, the scene classifier neural network 322 includes a fully convolutional neural network. In some embodiments, the scene classifier neural network 322 is configured to receive updated parameters and weights from an external device. In some embodiments, the scene classifier neural network 322 is configured to receive updated parameters and weights periodically. In some embodiments, the scene classifier neural network 322 is configured to receive updated parameters and weights in response to a request from an occupant of a vehicle including the detecting vehicle system.

The scene classifier neural network 322 is configured to output a determination regarding whether a type of scene 330. In some embodiments, the scene classifier neural network 322 is configured to only output the type of scene 330 in response to a determination that the scene is abnormal.

One of ordinary skill in the art would understand that modifications to the functional diagram 300 are within the scope of this disclosure. For example, in some embodiments, the scene classifier neural network 322 is further configured to output a position of the scene. In some embodiments, the scene classifier neural network 322 is configured to receive gaze data, e.g., from gaze detector 130 (FIG. 1), to assist with determination of a position of the scene. In some embodiments, the scene classifier neural network 322 is configured to receive GPS data, e.g., from GPS 116 (FIG. 1), to assist with determination of a position of the object. One of ordinary skill in the art would understand that additional modifications are also within the scope of this description.

Figure 4:
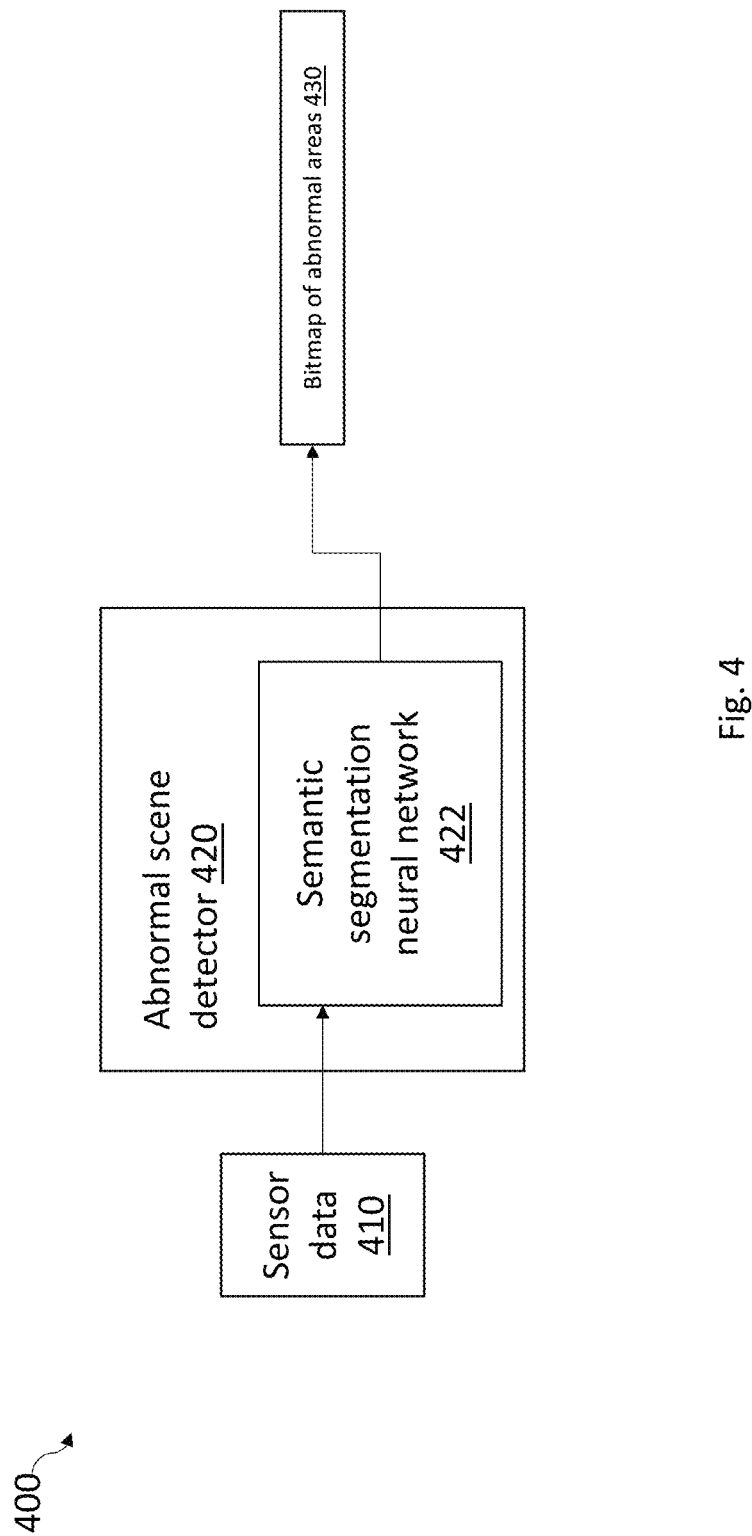
FIG. 4 is a functional diagram of a detecting vehicle system in accordance with some embodiments.

FIG. 4 is a functional diagram 400 of a portion of a detecting vehicle system in accordance with some embodiments. In some embodiments, the detecting vehicle system includes the detecting vehicle system 110 (FIG. 1). In some embodiments, the functionality of the diagram 400 is implemented using abnormal scene detector 128 (FIG. 1). In some embodiments, the functionality of the diagram 400 is implemented using system 900 (FIG. 9).

Sensor data 410 is collected from one or more sensors attached to a vehicle. In some embodiments, the one or more sensors are integral with the vehicle. In some embodiments, at least one of the one or more sensors is separable from the vehicle. In some embodiments, at least one of the one or more sensors includes smart glasses. In some embodiments, the one or more sensors correspond to sensor 114 (FIG. 1).

The sensor data 410 is received by an abnormal scene detector 420. In some embodiments, the abnormal scene detector 420 corresponds to the abnormal scene detector 128 (FIG. 1). The abnormal scene detector 420 includes a semantic segmentation neural network 422. The semantic segmentation neural network 422 is configured to analyze the sensor data 410 to determine whether an environment surrounding the vehicle includes an abnormal scene or combination of objects. For example, where the sensor data 410 includes one or more images, the semantic segmentation neural network 422 is configured to classify each pixel of the one or more images to determine whether an object is present in the corresponding pixel and a type of object if an object is present. In some embodiments, the object type includes a vehicle, roadway, fallen objects, humans, or other suitable object types. In some embodiments, the semantic segmentation neural network 422 is further configured to compare any identified scenes with map data, e.g., from the map 118 (FIG. 1), to determine whether the identified scene is an abnormal scene. The semantic segmentation neural network 422 includes a fully or partially trained neural network usable for object recognition. In some embodiments, the semantic segmentation neural network 422 includes a fully convolutional neural network. In some embodiments, the semantic segmentation neural network 422 is configured to receive updated parameters and weights from an external device. In some embodiments, the semantic segmentation neural network 422 is configured to receive updated parameters and weights periodically. In some embodiments, the semantic segmentation neural network 422 is configured to receive updated parameters and weights in response to a request from an occupant of a vehicle including the detecting vehicle system.

The semantic segmentation neural network 422 is configured to output a bit map of abnormal areas 430. In some embodiments, the semantic segmentation neural network 422 is configured to only output the bitmap of abnormal areas 430 in response to a determination that the scene is abnormal. In some embodiments, the semantic segmentation neural network 422 is configured to determine that any scene that is not able to be identified is an abnormal scene. The bitmap of abnormal areas 430 includes information related to whether the vehicle is able to move to a location in the surrounding environment. In some embodiments, the bitmap includes a color-coded map, such as a heat map, indicating whether the vehicle is able to move to different locations.

The following description utilizes an example where the sensor data 410 includes image information from a front camera of the vehicle. In some embodiments, the bitmap indicates whether the vehicle is able to move forward into a specific location to avoid an identified abnormal scene or object. In some embodiments, the bitmap indicates whether the vehicle should avoid a specific location due to the presence of an identified abnormal scene or object.

One of ordinary skill in the art would understand that modifications to the functional diagram 400 are within the scope of this disclosure. For example, in some embodiments, the semantic segmentation neural network 422 is further configured to output a position of the scene. In some embodiments, the semantic segmentation neural network 422 is configured to receive gaze data, e.g., from gaze detector 130 (FIG. 1), to assist with determination of a position of the scene. In some embodiments, the semantic segmentation neural network 422 is configured to receive GPS data, e.g., from GPS 116 (FIG. 1), to assist with determination of a position of the object. One of ordinary skill in the art would understand that additional modifications are also within the scope of this description.

Figure 5:
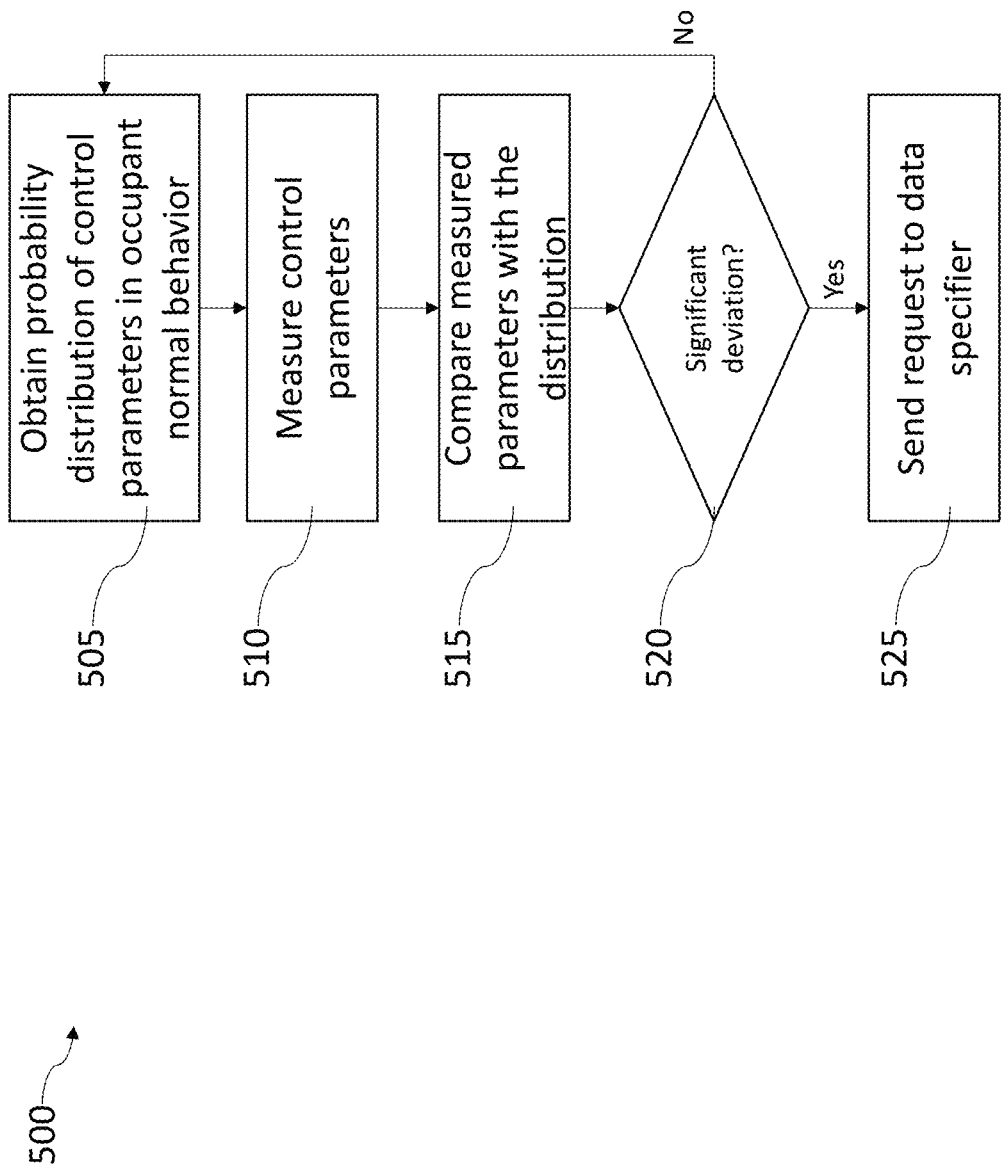
FIG. 5 is a flowchart of a method of detecting a hazard in accordance with some embodiments.

FIG. 5 is a flowchart of a method 500 of detecting a hazard in accordance with some embodiments. In some embodiments, the method 500 is implemented using the detecting vehicle system 110 (FIG. 1). In some embodiments, the method 500 is implemented using the system 900 (FIG. 9). The following description focuses primarily on a driver of a vehicle. However, one of ordinary skill in the art would understand that the method 500 is also applicable to other occupants in a vehicle.

In operation 505, a probability distribution of control parameters in a normal behavior of an occupant is obtained. The probability distribution corresponds to normal behavior of the occupant. In some embodiments, the profile of the normal behavior relates to a plurality of behaviors. In some embodiments, the behaviors included at least one of viewing direction behavior, speed of travel behavior, acceleration/braking behavior, steering behavior, or other suitable behaviors. The viewing direction behavior relates to how much of the attention of the driver is directed in a direction that the vehicle is traveling. The speed of travel behavior relates to a speed that the driver normally operates the vehicle. The acceleration/braking behavior relates to how the driver normally uses the accelerator or the brakes. The steering behavior relates to a magnitude and suddenness of turning of a steering wheel of the vehicle. In some embodiments, a correlation between the factors is used to develop the profile. For example, in some embodiments, a speed of the vehicle and a steering behavior are combined. Using the normal behavior profile of the driver, the distribution of control parameters associated with this normal behavior is obtained.

In operation 510, control parameters of the occupant are measured. In some embodiments, the control parameters are measured using an occupant monitoring camera, e.g., occupant monitoring camera 112 (FIG. 1). In some embodiments, the control parameters are measured using a gyroscope, an accelerometer, a speedometer, or other suitable sensor within the vehicle.

In operation 515, the measured control parameters from operation 510 are compared with the distribution obtained in operation 505. In some embodiments, multiple parameter distributions are obtained in operation 505. For example, a viewing direction distribution for the driver is obtained as well as an acceleration/braking distribution for the driver. In some embodiments where multiple distributions are obtained in operation 505, the operation 515 includes comparing the measured control parameters with each corresponding distribution obtained in operation 505. That is, in some embodiments, the viewing direction distribution is compared with gaze data, e.g., received from gaze detector 130 (FIG. 1), and the acceleration/braking distribution is compared with vehicle acceleration/braking, e.g., received from an accelerometer.

In operation 520 a determination is made regarding whether the deviation from the obtained distribution is a significant deviation. A significant deviation is a deviation that is highly unusual behavior for the driver. For example, was the driver looking out of a side window for a prolonged period of time; or did the driver suddenly turn the steering wheel when the driver normally makes smoother turns. In some embodiments, a deviation is considered to be a significant deviation in response to the deviation being three or more standard deviations from a highest probability behavior. In some embodiments, the threshold of the deviation is changed dynamically based on external information such as traffic information, such as VICS and TMC, or based on instructions from abnormal situation detector 122. By limiting hazard notifications to only significant deviations, false positives are reduced, and processing load and power consumption of the detecting vehicle are reduced. Reduced power consumption helps to reduce battery consumption in electric or hybrid vehicles. Additional information with respect to deviations from normal behavior is provided below with respect to FIG. 6.

In response to a determination that a significant deviation occurred, the method 500 proceeds to operation 525. In response to a determination that a significant device did not occur, the method 500 returns to operation 505. In some embodiments, the probability distribution is continually updated based on newly measured control parameters. In some embodiments, in response to the determination that the significant deviation did not occur, the method 500 returns to operation 510 and the probability distribution is not updated.

In operation 525, a request is sent to a data specifier to identify sensor data relevant to the significant deviation. In some embodiments, the data specifier corresponds to the data specifier 132 (FIG. 1). The request to the data specifier requests that the data specifier retriever sensor data from sensors of the vehicle to generate log data for notifying other vehicles of a hazard that likely triggered the significant deviation from normal driver behavior.

Figure 6:
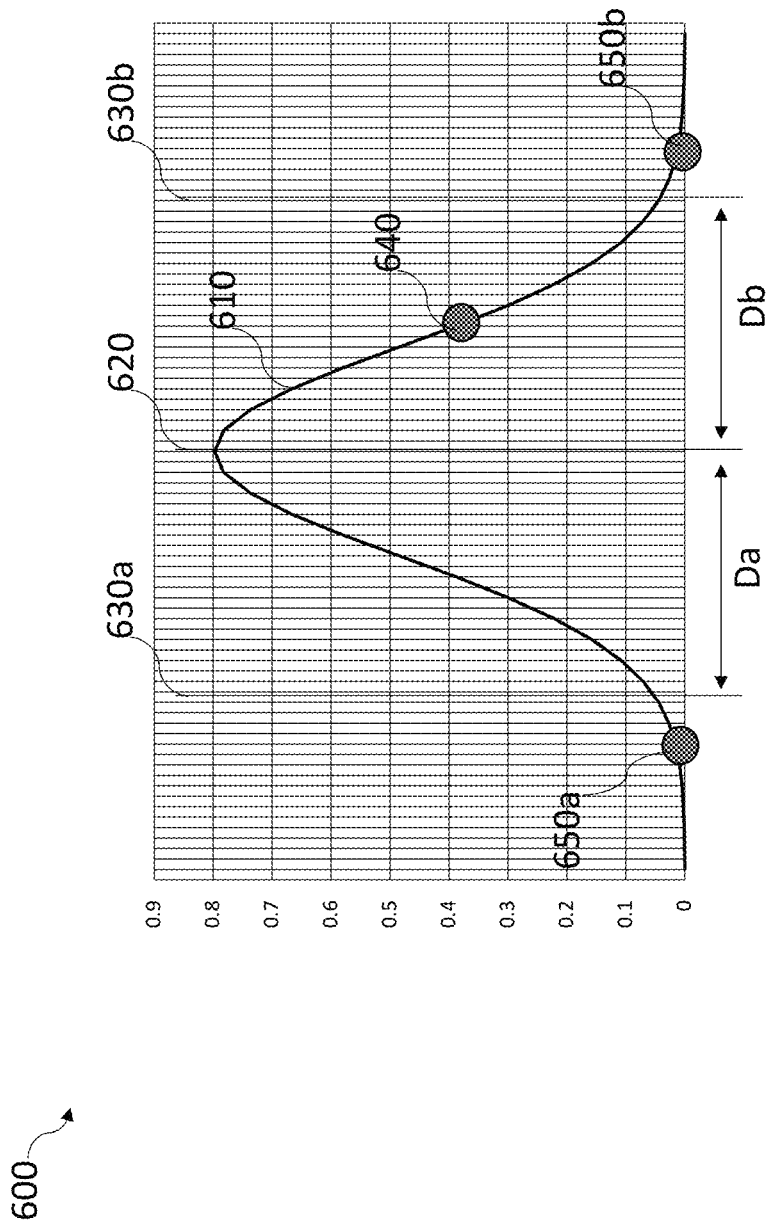
FIG. 6 is a plot of an occupant parameter in accordance with some embodiments.

FIG. 6 is a plot 600 of an occupant parameter in accordance with some embodiments. In some embodiments, the plot 600 is usable by the abnormal situation detector 122 (FIG. 1) to determine whether the detected occupant behavior is normal or abnormal. In some embodiments, the plot 500 is usable in operation 520 (FIG. 5) to determine whether a significant deviation from occupant behavior occurred. In some embodiments, the plot 600 is usable by the system 900 (FIG. 9) to determine whether a hazard is present. The following description focuses primarily on a driver of a vehicle. However, one of ordinary skill in the art would understand that the description is also applicable to an occupant of a vehicle other than the driver.

The plot 600 includes a behavior distribution line 610 that indicates behavior by the driver. In some embodiments, the behavior distribution line 610 is called a performance curve. The behavior distribution line 610 indicates how the driver behaves during operation of the vehicle. A peak performance value at line 620 indicates a most common behavior of the driver. Using acceleration/braking of the vehicle as an example, the peak performance value at line 620 indicates a most common amount of pressure applied to the brakes of a vehicle across all the times that the driver applies the brakes.

The plot 600 also includes threshold values at lines 630a and 630b. The threshold values indicate performance by the driver that is significantly different from the peak performance value at line 620. The threshold value at line 630a is a deviation Da from the peak performance value at line 620. The threshold value at line 630b is a deviation Db from the peak performance value at line 620. In some embodiments, the deviation Da is equal to the deviation Db. In some embodiments, the deviation Da is different from the deviation Db. In some embodiments, each of the deviation Da and the deviation Db are three or more standard deviation from the peak performance value at line 620. If the deviations Da and Db are too small, then a risk of false positives increases, in some instances. If the deviations Da and Db are too large, then a risk of false negatives increases, in some instances. The deviations Da and Db are set to balance processing load and power consumption of the detecting vehicle with reliable hazard notification to notified vehicles. In some embodiments, the threshold of the deviation can be changed dynamically based on external information such as traffic information, such as VICS and TMC, or based on instructions from abnormal situation detector 122.

During a determination regarding whether an occupant behaves abnormally, a parameter associated with the occupant, such as a driver braking a vehicle, is measured. The measured parameter is applied to the plot 600 to determine whether the behavior constitutes a significant deviation from the peak performance value at line 620. If a measured control parameter falls at point 640 in the plot 600, the performance of the occupant is determined not to have been a significant deviation from the peak performance value at line 620. In contrast, if the measured control parameter fails at point 650a or 650b, then the performance is considered to have been a significant deviation from the peak performance value at line 620 because the performance parameter is more than deviation Da, for point 650a, or deviation Db, for point 650b, from the peak performance value at line 620.

The plot 600 includes a bell curve centered at the peak performance value at line 620. However, one of ordinary skill in the art would understand that other behavior distribution line shapes are within the scope of this description.

Figure 7:
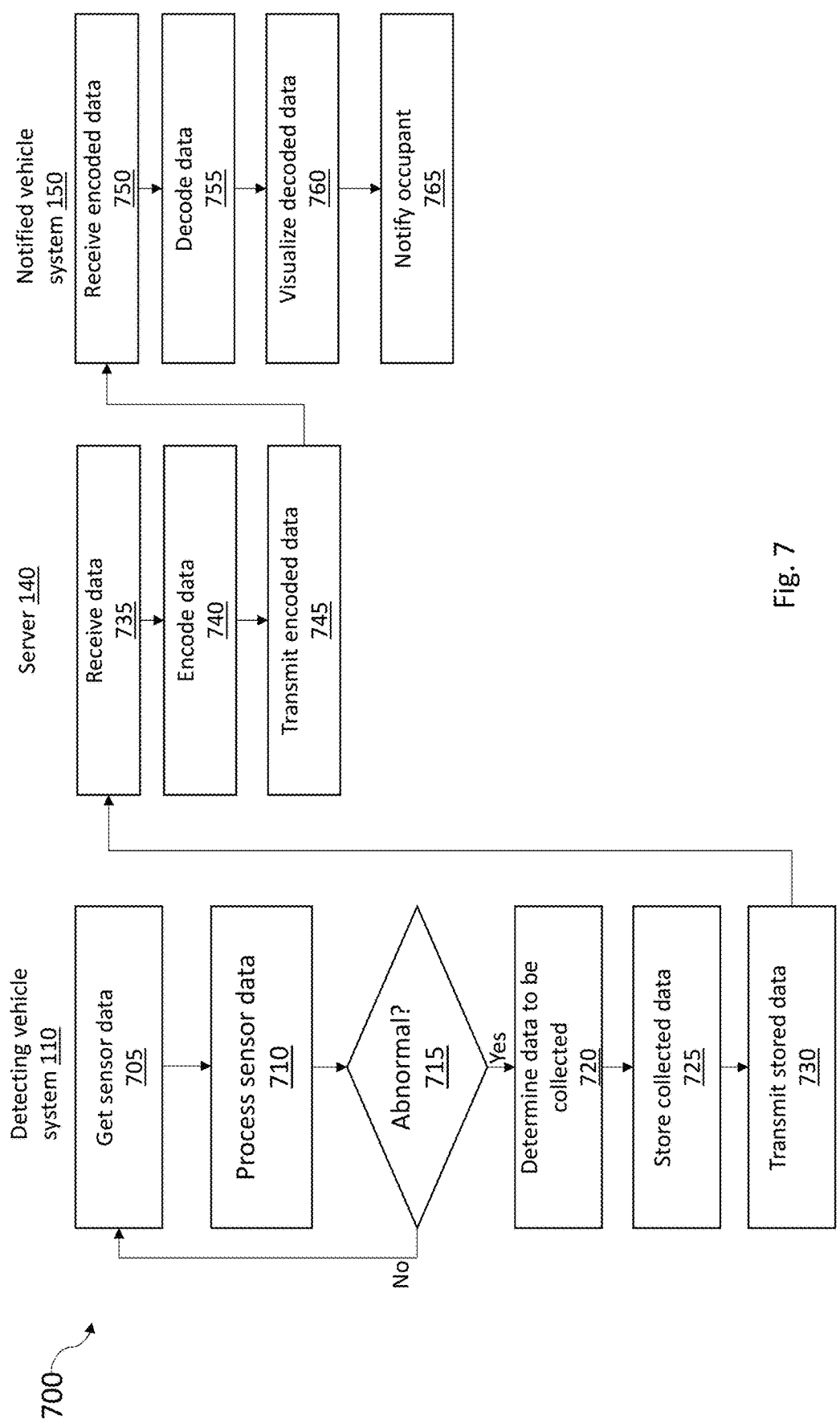
FIG. 7 is a flowchart of a method of implementing a hazard notification system in accordance with some embodiments.

FIG. 7 is a flowchart of a method 700 of implementing a hazard notification system in accordance with some embodiments. In some embodiments, the method 700 is implemented using the hazard notification system 100 (FIG. 1). In some embodiments, the method 700 is implemented using the system 900 (FIG. 9). The following description focuses primarily on a driver of a vehicle. However, one of ordinary skill in the art would understand that the method 700 is also applicable to other occupants in a vehicle.

In operation 705, sensor data is collected. The sensor data is collected by one or more sensors connectable to the vehicle. In some embodiments, the sensor data includes control parameters of the vehicle. In some embodiments, the sensor data includes information about a gaze direction of a driver of the vehicle. In some embodiments, the sensor data includes information related to an environment surrounding the vehicle. In some embodiments, the sensor data includes data from the sensor 114 (FIG. 1) and/or the occupant monitoring camera 112 (FIG. 1).

In operation 710, the sensor data is processed. The sensor data is processed to determine whether a behavior of the driver of the vehicle or whether an abnormal object or scene is detected by the one or more sensors. In some embodiments, the sensor data is processed by the abnormal situation detector 122 (FIG. 1).

In operation 715, a determination is made regarding whether the sensor data indicates an abnormal behavior or whether an abnormal object or scene is present. In some embodiments, the determination is made based on whether the sensor data indicates the driver performance is a significant deviation from a normal a driver performance. In some embodiments, the determination is made based on a driver performance curve, e.g., plot 600 (FIG. 6). In some embodiments, the determination is made based on objects or information detected by the one or more sensors related to the environment surrounding the vehicle. In some embodiments, the determination is made using the abnormal situation detector 122 (FIG. 1).

In response to a determination that an abnormal situation was detected, the method 700 proceeds to operation 720. In response to a determination that an abnormal situation was not detected, the method 700 returns to operation 705.

In operation 720, a determination is made regarding what sensor information should be collected based on the type of abnormal situation. In some embodiments, the determination is made based on gaze data, e.g., from the gaze detector 130 (FIG. 1). In some embodiments, the determination is made based on a measured control performance of the driver. In some embodiments, the determination is made based on an identified abnormal object or scene. In some embodiments, the determination is made using the data specifier 132 (FIG. 1). In some embodiments, the collected data is cropped or processed to reduce or remove extraneous data.

In operation 725, the collected data is stored. In some embodiments, the collected data is stored in a memory. In some embodiments, the collected data is stored in association with timestamp information related to when the data was collected or when the abnormal situation was determined. In some embodiments, the collected data is stored using a log collector 134 (FIG. 1).

In operation 730, the stored data is transmitted to the server 140. In some embodiments, the stored data is transmitted wirelessly. In some embodiments, the stored data is transmitted via a wired connection. In some embodiments, the stored data is transmitted using the log transmitter 136 (FIG. 1).

In operation 735, the transmitted data is received by the server 140. In some embodiments, the data is received by the log data receiver 142 (FIG. 1). In some embodiments, the received data is stored in a memory on the server 140. In some embodiments, the received data is stored in a prioritized queue on the server 140.

In operation 740, the received data is encoded. In some embodiments, the received data is encoded according to a predetermined encoding protocol. In some embodiments, the received data is encoded based on a type of data received. In some embodiments, the data is encoded according to a priority of the data in a prioritized queue. In some embodiments, the encoded data is stored in a memory on the server 140. In some embodiments, the encoded data is stored in the memory in a prioritized queue on the server 140.

In operation 745, the encoded data is transmitted to the notified vehicle system 150. In some embodiments, the encoded data is transmitted wirelessly. In some embodiments, the encoded data is transmitted via a wired connection. In some embodiments, the encode data is transmitted according to a priority of the encoded data in a prioritized queue. In some embodiments, the encoded data is transmitted to vehicles based on a known location or navigation path of the vehicle. In some embodiments, the encoded data is transmitted by the log transferer 146 (FIG. 1).

In operation 750, the encoded data is received. In some embodiments, the encoded data is received by the log decoder 154 (FIG. 1). In some embodiments, the received data is stored in a memory on the notified vehicle system 150 prior to decoding. In some embodiments, the received data is stored in a prioritized queue on the notified vehicle system 150.

In operation 755, the data is decoded. In some embodiments, the data is decoded according to a predetermined decoding protocol. In some embodiments, the data is decoded based on encoding protocol information received with the data from the server 140. In some embodiments, the data is decoded according to a type of data received. In some embodiments, the data is decoded based on a priority in the prioritized queue. In some embodiments, the decoded data is stored in the memory in the notified vehicle system 150. In some embodiments, the decoded data is stored in the memory in the notified vehicle system 150 in a prioritized queue. In some embodiments, the data is decoded by log decoder 154 (FIG. 1).

In operation 760, the decoded data is visualized. Visualizing the decoded data provides a visual representation of the data. In some embodiments, the visual representation includes an image of an abnormal situation. In some embodiments, the visual representation includes an icon representing the abnormal situation. In some embodiments, the visual representation includes a location of the abnormal situation on a map. In some embodiments, the decoded data is visualized using log visualizer 156 (FIG. 1).

In operation 765, the occupant is notified about the abnormal situation. In some embodiments, the occupant is notified using a UI, e.g., UI 158 (FIG. 1). In some embodiments, the occupant is notified using a mobile device accessible by the occupant. In some embodiments, the notification includes an audio or visual alert. In some embodiments, the notification is configured to automatically generate an alert on the mobile device accessible by the occupant. In some embodiments, the notification includes updated navigation information. In some embodiments where the vehicle is an autonomous driving vehicle, the notification includes instructions to the autonomous driving vehicle for avoiding the abnormal situation.

One of ordinary skill in the art would understand that modifications to the method 700 are within the scope of this description. In some embodiments, at least one additional operation is included in the method 700. For example, in some embodiments the method 700 further includes receiving a confirmation of the abnormal situation from the occupant as the notified vehicle reaches a location of the abnormal situation. In some embodiments, at least one operation of the method 700 is excluded. For example, in some embodiments, the operation 740 is excluded and the data is provided to the notified vehicle system 150 without encoding the data. In some embodiments, an order of operation of the method 700 is adjusted. For example, in some embodiments, operation 725 occurs prior to a determination regarding whether the abnormal situation exists to help preserve sensor data. One of ordinary skill in the art would understand that other modifications to the method 700 are within the scope of this description.

Figure 8:
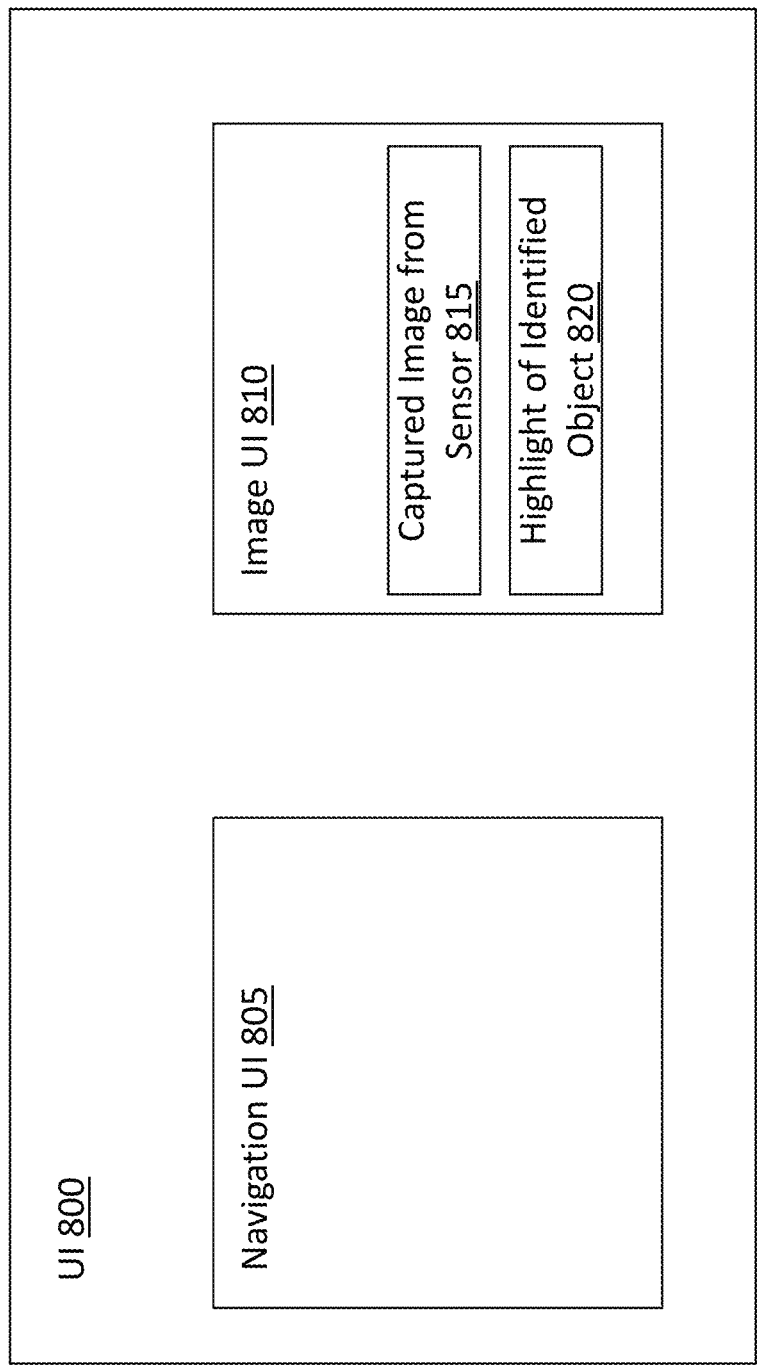
FIG. 8 is a view of a user interface in accordance with some embodiments.

FIG. 8 is a view of a user interface 800 in accordance with some embodiments. In some embodiments, the UI 800 corresponds to UI 158 (FIG. 1). In some embodiments, UI 800 is part of a mobile device accessible by the occupant 160 (FIG. 1). In some embodiments, UI 800 is part of notified vehicle system 150 (FIG. 1). In some embodiments, the UI 800 is implemented using the system 900 (FIG. 9).

The UI 800 includes a navigation UI 805 and an image UI 810. The image UI 810 includes a captured image from a vehicle sensor 815 and a highlight of the identified object 820. The UI 800 is usable to notify the occupant of an abnormal situation using image UI 810. The UI 800 is further usable to notify the occupant of a travel path to the avoid the abnormal situation using navigation UI 805. In some embodiments, the UI 800 is configured to receive information from the occupant to confirm a continued existence of the abnormal situation. In some embodiments, the UI 800 is integrated into the vehicle. In some embodiments, the 800 is separable from the vehicle.

The navigation UI 805 is configured to receive GPS information, e.g., from GPS 116 (FIG. 1), and display a map visible to the driver of the vehicle. The navigation UI 805 is further configured to display a travel path along the map that the vehicle is able to traverse to reach the identified object. In some embodiments, the navigation UI 805 includes a touchscreen. In some embodiments, the navigation UI 805 is configured to receive updates to the map and/or the travel path from an external device, such as the server 140 (FIG. 1).

The image UI 810 includes a captured image from the vehicle sensor 815 and a highlight of the object 820 associated with the abnormal situation. The highlight of the identified object 820 overlaps the image from the vehicle sensor 815 to identify the object within the image from the vehicle sensor. In some embodiments, the image from the vehicle sensor 815 is a cropped image from the vehicle sensor. In some embodiments, the image UI 810 is able to receive input from the occupant to confirm or deny the continued existence of the abnormal situation. In some embodiments, the image UI 810 includes a touchscreen.

FIG. 8 includes the navigation UI 805 as being separate from the image UI 810. In some embodiments, the image UI 810 is overlaid on the navigation UI 805. In some embodiments, the image UI 810 is hidden while vehicle is in motion.

FIG. 9 is a block diagram of a system for implementing object identification in accordance with some embodiments. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with external devices. The processor 902 is electrically coupled to the computer readable storage medium 904 via a bus 908. The processor 902 is also electrically coupled to an input/output (I/O) interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in hazard notification system 100 (FIG. 1), method 500 (FIG. 5) or method 700 (FIG. 7).

In some embodiments, the processor 902 is a central processing unit (CPU), a multi-processor, a distributed processing system, an application specific integrated circuit (ASIC), and/or a suitable processing unit.

In some embodiments, the computer readable storage medium 904 includes an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform a portion or all of the operations as described in hazard notification system 100 (FIG. 1), method 500 (FIG. 5) or method 700 (FIG. 7). In some embodiments, the storage medium 904 also stores information needed for performing a portion or all of the operations as described in hazard notification system 100 (FIG. 1), method 500 (FIG. 5) or method 700 (FIG. 7) as well as information generated during performing a portion or all of the operations as described in hazard notification system 100 (FIG. 1), method 500 (FIG. 5) or method 700 (FIG. 7), such as a sensor data parameter 916, a distribution parameter 918, a collected data parameter 920, an encoding protocol parameter 922, and/or a set of executable instructions to perform a portion or all of the operations as described in object identification system 100 (FIG. 1), method 200 (FIG. 2) or method 300 (FIG. 3).

In some embodiments, the storage medium 904 stores instructions 907 for interfacing with external devices. The instructions 907 enable processor 902 to generate instructions readable by the external devices to effectively implement a portion or all of the operations as described in hazard notification system 100 (FIG. 1), method 500 (FIG. 5) or method 700 (FIG. 7).

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in hazard notification system 100 (FIG. 1), method 500 (FIG. 5) or method 700 (FIG. 7) is implemented in two or more systems 900, and information such as sensor data parameter 916, distribution parameter 918, collected data parameter 920, or encoding protocol parameter 922 are exchanged between different systems 900 via network 914.

An aspect of this description relates to a method of identifying a hazard. The method includes receiving control parameter data from a first sensor attached to a vehicle, wherein the control parameter data is associated with a behavior of an occupant of the vehicle. The method further includes comparing the control parameter data with a performance distribution of the occupant to determine whether the control parameter indicates abnormal behavior. The method further includes identifying, in response to a determination that the control parameter indicates abnormal behavior, sensor data to be collected from a second sensor attached to the vehicle. The method further includes generating log data based on the collected sensor data. The method further includes transmitting the log data to an external device. In some embodiments, comparing the control parameter data with the performance distribution includes determining that the control parameter indicates abnormal behavior in response to the control parameter data being three or more standard deviations from a peak value of the performance distribution. In some embodiments, receiving the control parameter data includes receiving data related to at least one of acceleration of the vehicle, steering of the vehicle, or speed of the vehicle. In some embodiments, receiving the control parameter data includes receiving gaze data indicating a direction in which a gaze of the occupant is directed. In some embodiments, identifying the sensor data to be collected includes identifying image data from a camera attached to the vehicle. In some embodiments, the method further includes cropping the image data prior to generating the log data. In some embodiments, generating the log data includes associating the collected sensor data with a location at which the sensor data was captured. In some embodiments, the method further includes capturing an image of an environment surrounding the vehicle. In some embodiments, the method further includes performing object recognition on the image, using a trained neural network, to determine whether an abnormal object is present in the image. In some embodiments, the method further includes performing scene classification on the image, using a trained neural network, to determine whether an abnormal scene is present in the image. In some embodiments, the method further includes performing semantic segmentation on the image, using a trained neural network, to generate a bitmap of the environment surrounding the vehicle.

An aspect of this description relates to a hazard identification system. The system includes a non-transitory computer readable medium configured to store instructions thereon. The system further includes a processor connected to the non-transitory computer readable medium. The processor is configured to execute the instructions for receiving control parameter data from a first sensor attached to a vehicle, wherein the control parameter data is associated with a behavior of an occupant of the vehicle. The processor is further configured to execute the instructions for comparing the control parameter data with a performance distribution of the occupant to determine whether the control parameter indicates abnormal behavior. The processor is further configured to execute the instructions for identifying, in response to a determination that the control parameter indicates abnormal behavior, sensor data to be collected from a second sensor attached to the vehicle. The processor is further configured to execute the instructions for generating log data based on the collected sensor data. The processor is further configured to execute the instructions for generating instructions for transmitting the log data to an external device. In some embodiments, the processor is further configured to execute the instructions for determining that the control parameter indicates abnormal behavior in response to the control parameter data being three or more standard deviations from a peak value of the performance distribution. In some embodiments, the processor is further configured to execute the instructions for receiving the control parameter data including data related to at least one of acceleration of the vehicle, steering of the vehicle, or speed of the vehicle. In some embodiments, the processor is further configured to execute the instructions for receiving the control parameter data including gaze data indicating a direction in which a gaze of the occupant is directed. In some embodiments, the processor is further configured to execute the instructions for identifying the sensor data to be collected including image data from a camera attached to the vehicle. In some embodiments, the processor is further configured to execute the instructions for cropping the image data prior to generating the log data. In some embodiments, the processor is further configured to execute the instructions for generating the log data including associating the collected sensor data with a location at which the sensor data was captured.

An aspect of this description relates to a method of notifying a notified vehicle of a hazard. The method includes receiving control parameter data from a first sensor attached to a detecting vehicle, wherein the control parameter data is associated with a behavior of an occupant of the detecting vehicle. The method further includes comparing the control parameter data with a performance distribution of the occupant of the detecting vehicle to determine whether the control parameter indicates abnormal behavior. The method further includes generating log data based on data from a second sensor attached to the detecting vehicle in response to a determination that the control parameter indicates abnormal behavior. The method further includes transmitting the log data to the notified vehicle. The method further includes notifying an occupant of the notified vehicle of a hazard based on the log data. In some embodiments, transmitting the log data includes transmitting the log data from the detecting vehicle to a server; encoding the log data using the server; and transmitting the encoded log data to the notified vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of identifying a hazard, the method comprising:
   receiving control parameter data from a first sensor attached to a vehicle, wherein the control parameter data is associated with a behavior of an occupant of the vehicle;
   comparing the control parameter data with a performance distribution of the occupant to determine whether the control parameter indicates abnormal behavior;
   identifying, in response to a determination that the control parameter indicates abnormal behavior, sensor data to be collected from a second sensor attached to the vehicle;
   generating log data based on the collected sensor data; and
   transmitting the log data to an external device.

2. The method according to claim 1, wherein comparing the control parameter data with the performance distribution comprises:
   determining that the control parameter indicates abnormal behavior in response to the control parameter data being three or more standard deviations from a peak value of the performance distribution.

3. The method according to claim 1, wherein receiving the control parameter data comprises receiving data related to at least one of acceleration of the vehicle, steering of the vehicle, or speed of the vehicle.

4. The method according to claim 1, wherein receiving the control parameter data comprises receiving gaze data indicating a direction in which a gaze of the occupant is directed.

5. The method according to claim 1, wherein identifying the sensor data to be collected comprises identifying image data from a camera attached to the vehicle.

6. The method according to claim 5, further comprising cropping the image data prior to generating the log data.

7. The method according to claim 1, wherein generating the log data comprises associating the collected sensor data with a location at which the sensor data was captured.

8. The method according to claim 1, further comprising capturing an image of an environment surrounding the vehicle.

9. The method according to claim 8, further comprises performing object recognition on the image, using a trained neural network, to determine whether an abnormal object is present in the image.

10. The method according to claim 8, further comprising performing scene classification on the image, using a trained neural network, to determine whether an abnormal scene is present in the image.

11. The method according to claim 8, further comprising performing semantic segmentation on the image, using a trained neural network, to generate a bitmap of the environment surrounding the vehicle.

12. A hazard identification system, the system comprising:
   a non-transitory computer readable medium configured to store instructions thereon; and
   a processor connected to the non-transitory computer readable medium, wherein the processor is configured to execute the instructions for:
      receiving control parameter data from a first sensor attached to a vehicle, wherein the control parameter data is associated with a behavior of an occupant of the vehicle;
      comparing the control parameter data with a performance distribution of the occupant to determine whether the control parameter indicates abnormal behavior;
      identifying, in response to a determination that the control parameter indicates abnormal behavior, sensor data to be collected from a second sensor attached to the vehicle;
      generating log data based on the collected sensor data; and
      generating instructions for transmitting the log data to an external device.

13. The system according to claim 12, wherein the processor is further configured to execute the instructions for determining that the control parameter indicates abnormal behavior in response to the control parameter data being three or more standard deviations from a peak value of the performance distribution.

14. The system according to claim 12, wherein the processor is further configured to execute the instructions for receiving the control parameter data comprising data related to at least one of acceleration of the vehicle, steering of the vehicle, or speed of the vehicle.

15. The system according to claim 12, wherein the processor is further configured to execute the instructions for receiving the control parameter data comprising gaze data indicating a direction in which a gaze of the occupant is directed.

16. The system according to claim 12, wherein the processor is further configured to execute the instructions for identifying the sensor data to be collected comprising image data from a camera attached to the vehicle.

17. The system according to claim 16, wherein the processor is further configured to execute the instructions for cropping the image data prior to generating the log data.

18. The system according to claim 12, wherein the processor is further configured to execute the instructions for generating the log data comprising associating the collected sensor data with a location at which the sensor data was captured.

19. A method of notifying a notified vehicle of a hazard, the method comprising:
   receiving control parameter data from a first sensor attached to a detecting vehicle, wherein the control parameter data is associated with a behavior of an occupant of the detecting vehicle;
   comparing the control parameter data with a performance distribution of the occupant of the detecting vehicle to determine whether the control parameter indicates abnormal behavior;
   generating log data based on data from a second sensor attached to the detecting vehicle in response to a determination that the control parameter indicates abnormal behavior; and
   transmitting the log data to the notified vehicle; and
   notifying an occupant of the notified vehicle of a hazard based on the log data.

20. The method according to claim 19, wherein transmitting the log data comprises:
   transmitting the log data from the detecting vehicle to a server;
   encoding the log data using the server; and
   transmitting the encoded log data to the notified vehicle.

* * * * *